Dec. 8, 1942.  R. A. NORBOM  2,304,115
FREIGHT VEHICLE
Filed Aug. 2, 1940  3 Sheets-Sheet 1

INVENTOR.
Ragnar A. Norbom
BY Bates Teare McBean
Attorneys

Dec. 8, 1942.   R. A. NORBOM   2,304,115
FREIGHT VEHICLE
Filed Aug. 2, 1940   3 Sheets-Sheet 2
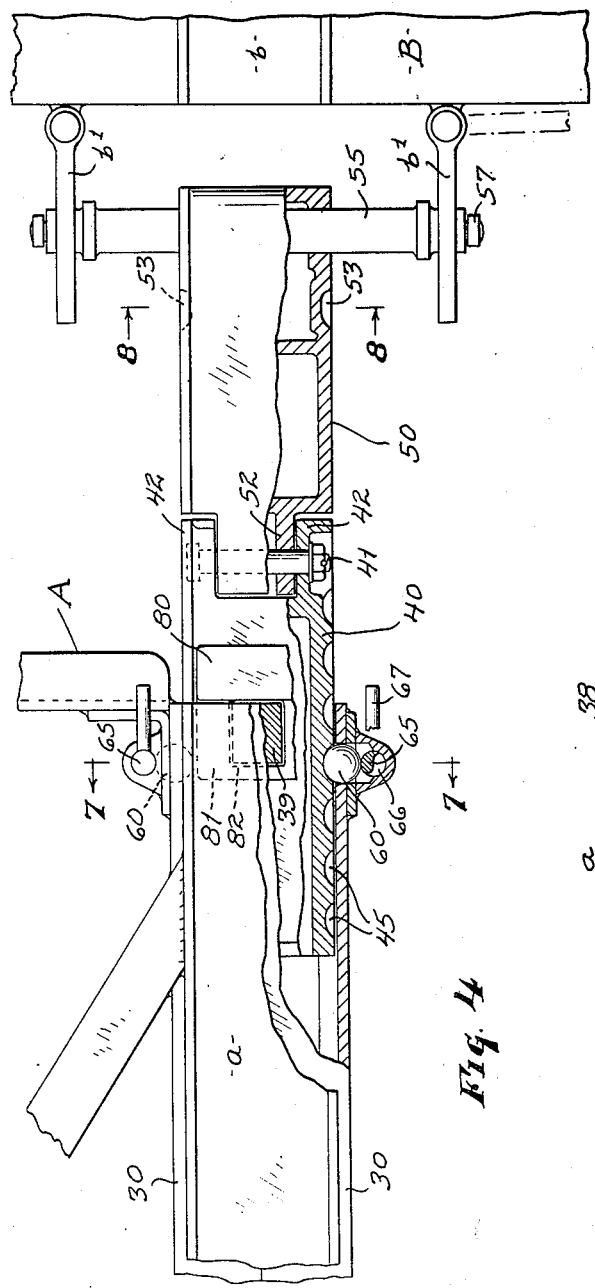
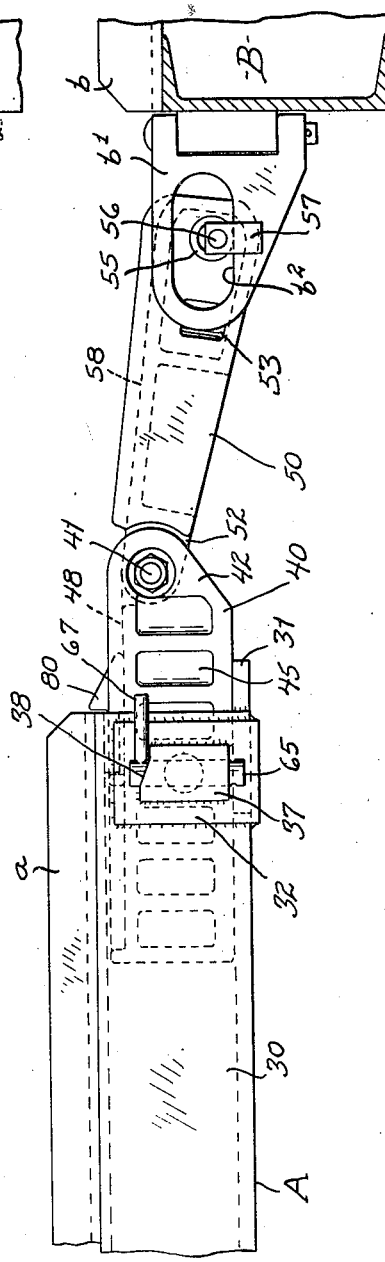
INVENTOR.
Ragnar A. Norbom,
BY Bates, Teare & McBean,
Attorneys.

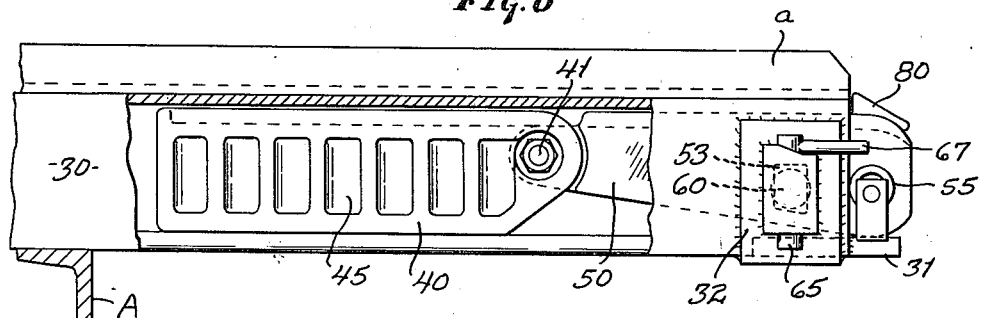
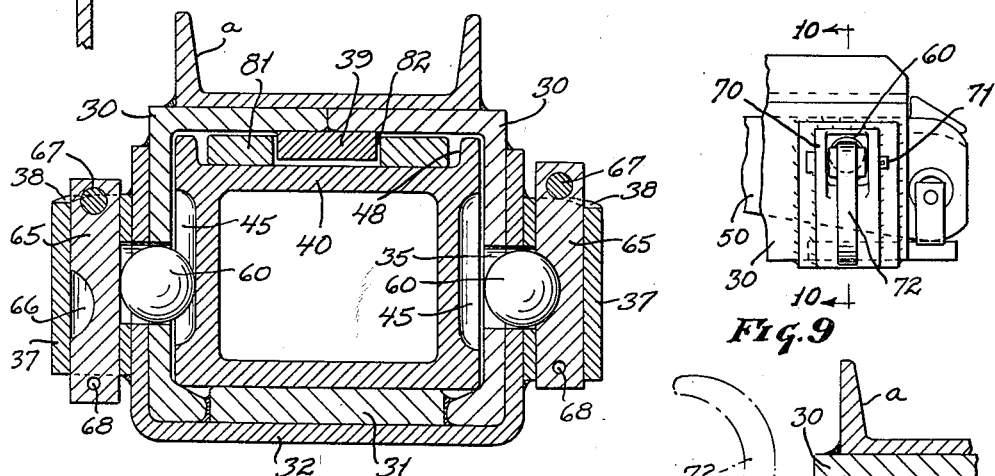
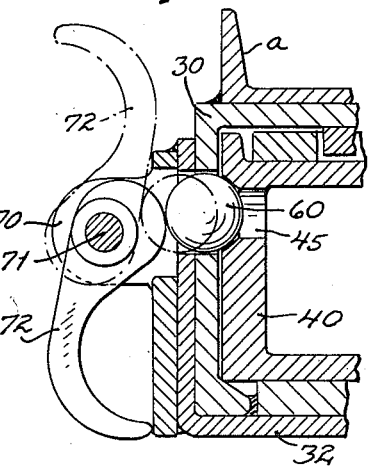
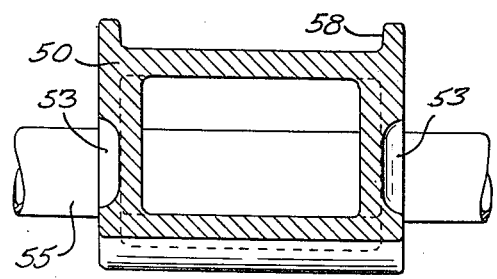

Patented Dec. 8, 1942

2,304,115

UNITED STATES PATENT OFFICE 2,304,115

FREIGHT VEHICLE

Ragnar A. Norbom, New York, N. Y., assignor to National Fitch Corporation, New York, N. Y., a corporation of Delaware Application August 2, 1940, Serial No. 349,696

5 Claims. (Cl. 14—71)

This invention relates to a vehicle adapted to transport a demountable body, the vehicle being provided with movable bridges adapted to connect it with another vehicle or with a platform to enable the body to be shifted from one to the other. The invention is in the nature of an improvement on that shown in my pending application No. 312,571, filed January 5, 1940.

The present invention is concerned particularly with an articulated bridge having one portion slidably mounted in the frame of the vehicle carrying the bridge and a second portion pivoted to the first portion and adapted to be attached to the other vehicle or the support. This construction provides for the different distances between the two vehicles and also for differences in elevation between them. The means for locking the slidable portion of the articulated bridge in its set position is also a feature of the invention. The invention is hereinafter more fully described and its essential novel features are set out in the claims.

Figure 1:
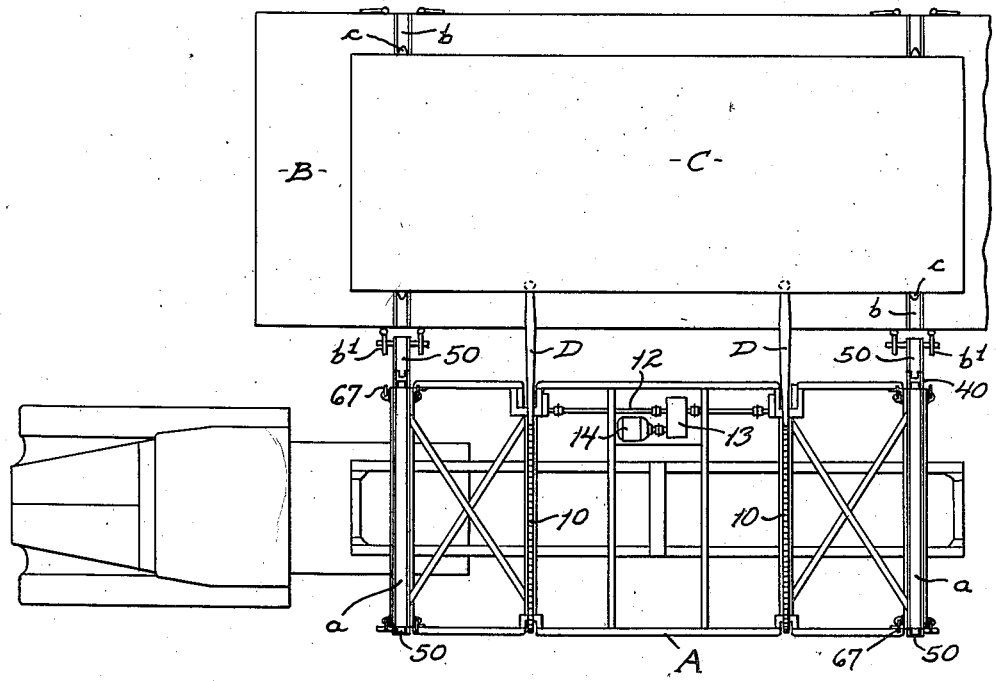
Figure 2:
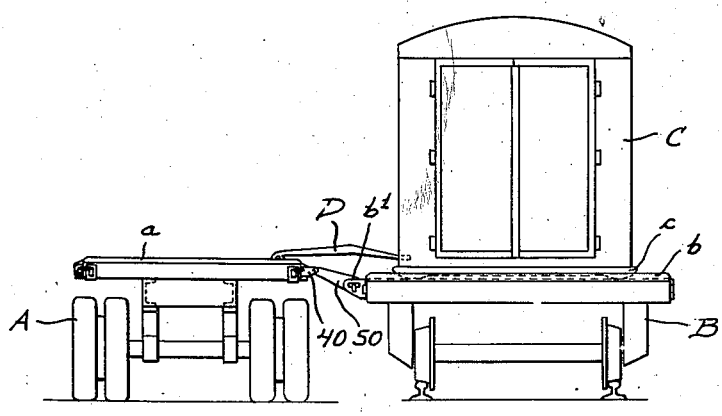
Figure 3:
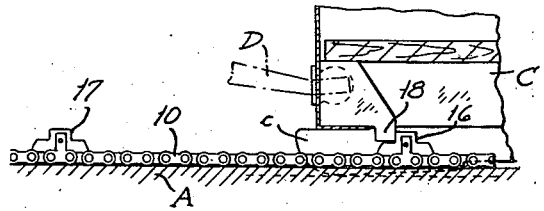

In the drawings Fig. 1 is a plan of a highway truck, a railway car and a container mounted on the car and coupled with propelling mechanism on the truck, ready for transference of the container across the articulated connecting bridges of this invention; Fig. 2 is an end elevation of the highway truck, railway car and demountable body or container, showing the container just as it has arrived on the railway car or just as it is about to start toward the highway truck; Fig. 3 is a fragmentary elevation of a portion of the propelling chain on the truck and the portion of the container directly engaged thereby; Fig. 4 is a sectional plan of one of the articulated bridges and the associated parts of the highway truck carrying it and the railway car to which it is attached; Fig. 5 is an elevation of the parts shown in Fig. 4; Fig. 6 is a sectional elevation partly broken away of the bridge and portion of the highway truck carrying it, the bridge being shown in its idle position which it occupies during travel of the highway truck; Fig. 7 is a vertical section across the bridge and its housing, in the plane indicated by the line 7—7 on Fig. 4; and Fig. 8 is a substantially vertical section across the extension of the bridge, as indicated by the line 8—8 on Fig. 4; Fig. 9 is a detail in elevation of a modified form of cam device for operating the locking balls; Fig. 10 is a vertical section on the line 10—10 in Fig. 9.

Referring first to Figs. 1 and 2 of the drawings, A represents a highway truck (which may comprise a tractor and a trailer), B a railway car, C a demountable container attached to stand on either the car or the truck. As illustrated, the container is a considerable size and is adapted for mounting on the car or truck lengthwise thereof and shifted laterally across the side of one of such vehicles to the other.

As shown, the container has skid rails $c$ on its base, which are adapted to occupy upwardly facing channels $a$ on the truck and $b$ on the car. To propel such container from the truck to the car or vice versa I may employ, if desired, the mechanism illustrated in Figs. 1 and 2. While this mechanism in itself forms no part of this application, it is convenient to describe it at this point, so far as it is shown in Figs. 1 and 2.

As shown, there is mounted transversely of the truck a pair of endless propelling chains 10 looped around suitable sprocket wheels, not shown, adjacent the edges of the truck. One sprocket wheel for each chain may be coupled to a shaft 12 which is connected through reduction gearing in housing 13 with a driving motor 14, so that the motor may move the two chains in unison.

Each sprocket chain may be connected to the container by a push-and-pull bar D, which may be attached to the chains and to the container to pull the container from the car onto the truck or push it from the truck onto the car. To provide for completing the movement of the container onto the truck after the ends of the push-and-pull bars reach the far end of the upper reach of the chain, there may be projections on the chain to engage projections on the container to complete the movement. Likewise in shifting the container from the truck to the car projections on the chain may engage projections on the container to start the movement of the container and carry it far enough so that one may conveniently attach the push-and-pull bars to complete the shoving operation.

The direct engagement above referred to is illustrated in Fig. 3, where the projection 16 on the chain is shown as engaging the downward projection 18 on the container for moving the container to the left, when the chain is moving to the left; similarly moving the chain toward the right may cause a lug 17 to engage the container lug 18 and move it toward the right.

To tie the truck to the railway car, not withstanding different elevations thereof, and varying distances between the two vehicles, I provide the articulated bridges of this invention which will now be described, it being understood that there are at least two of these bridges carried in parallel fashion by the truck frame. If the body moves lengthwise of the truck the pair of bridges would be at the rear, but, in the embodiment shown for transverse shifting, there are two bridges on each side of the truck, either pair adapted for attachment at their ends to a parallel railway car on one side or the other of the truck. In either case the bridges not only form positioning devices but constitute supports for the container in its passage from one vehicle to the other.

The transverse guiding channels $a$ on the truck are mounted on transversely extending hollow beams of the truck frame. These hollow beams, as shown in Fig. 7, comprise two of spaced channel beams 30 with their webs vertical and their flanges projecting toward each other. It is convenient to make the upper flanges of sufficient extent to abut each other, while the lower flanges are shorter and abut an immediate heavier strip 31. These parts are all welded together making a very firm hollow beam supporting the skid rail channels $a$. Near its ends the beam is reinforced by a U-shaped plate 32 embracing the beam and welded to it. This hollow beam is also a housing for the bridge about to be described.

Each bridge comprises two members 40 and 50 pivoted together at 41. The member 40 is a hollow casting of the form shown in Figs. 4 to 7 and slides readily into the space provided within the frame housing. The other member of the bridge 50 is also a hollow casting, as shown in Figs. 4, 5 and 8, and it is pivoted to the member 40 by a transverse pin 41. For effecting the pivot, I provide ears 42 on the end of the member 40 and ears 52 closer together on the member 50. These ears 52 lie between the ears 42, as shown in Fig. 4, and the pin 41 passes through all the ears.

The pivotally mounted member 50 of the bridge carries at its far end a transverse bar 55 which is adapted for attachment to the car side. The car may be provided with wings $b$—1 hinged thereto and having slots $b$—2 therein and the bar may extend through these wings when they are turned out at right angles to the car, as shown in Figs. 4 and 5, and as claimed in Patent No. 2,126,763, issued August 16, 1938, to B. F. Fitch. As illustrated in that patent the bar 55 may be hollow and carry a rod 56 with projecting end members 57 which can be turned into horizontal position and then passed through the slots and thereafter dropped into vertical position to lock the bar to the wings.

To lock the sliding member of the bridge to the truck, I form in opposite sides of the truck housing 30, cylindrical openings 35 which are occupied by steel balls 60, and I form in the sides of the sliding bridge member 40 a series of recesses 45, any of which may register with the passage-ways 35, according to the position of the bridge member. The balls 60 bear at their outer faces against suitable locking members which may cam the balls inwardly and hold them in the registering recesses. I have shown two alternative forms of these locking members.

The ball-locking members shown in Figs. 4 to 7 comprise rotatable pins 65. These pins have recesses 66 on one side which may receive a sufficient portion of the ball to enable the opposite face thereof to clear the bridge. Accordingly, the ball is freed from the bridge or caused to occupy the notches thereof, according to the position of the pin 65.

As shown in Fig. 7, the ball 60 at the right hand is occupying the recess of the pin 65 and is accordingly free from the bridge, while at the left hand the pin 65 is shown as turned 180° to carry its notch to idle position and bring its unnotched face against the ball, thus forcing the ball into the registering recess 45. By this means the bridge is locked or unlocked, as desired, by the pins.

Each pin 65 is provided with an operating handle 67 which may be turned as desired, to cam the ball into locking position or to free it. The pin is shown as mounted in a tubular ear 37 welded to the outer face of the reinforcing stirrup 32.

To prevent the pins 65 being inadvertently displaced from their locked position, I decline the upper end of the tubular ear as shown at 38, so that the handle 65 rides up the incline in turning the pin to unlocked position, as shown at the right hand position in Fig. 7. When the pin reaches the top of the incline it rests on a flat surface which is sufficient to retain the pin idle during the positioning of the bridge. Then to lock the bridge the handle 67 is swung outwardly into the position shown in Fig. 5 and at the left hand position in Fig. 7, in which case the handle is on a flat surface at the bottom of the incline, so that gravity holds it in that position. The pin 65 may have an opening 68 near the bottom for the passage of a car seal to hold the pin in its active position.

In place of the cam pins 65 rotatable on vertical axes as described, I may employ a cam lever, preferably mounted on a horizontal axis and swingable downwardly to force the balls inwardly. Such construcition is shown in Figs. 9 and 10. In this case in place of the tubular sleeves 38 on the outer faces of the housing, I provide ears 70 which carry a horizontal pin 71, parallel with the side of the housing, on which is mounted a cam lever 72. When the levers 72 are turned into their uppermost position, the balls are freed so that the bridge may be moved in and out as desired.

To lock the bridge by the lock of Figs. 9 and 10, one simply takes hold of the upper end of the cam lever 72 and swings it downwardly into its lowermost position, which forces the corresponding ball inwardly into the registering notch of the bridge. It will be noted from Fig. 10 that the reaction of the ball against the cam of the lever is in a direction above the line from the ball center to the pivotal axis of the cam lever, with the result that the outward pressure on the locked balls tends to hold the lever in its lowermost or locking position. In other words, the lever moves past the dead center to effect the locking. This cam lever provides a very simple arrangement for locking the balls effectively in engagement with the bridge or freeing them as desired.

It will be seen from the description given, that, when the locking devices are moved to their idle position the bridge may be shifted in and out, the sliding portion thereof telescoping within the truck housing, as may be required by the distance between the truck and the car. The slot $b$—2 in the attaching wings on the car allows some leeway in the position of the bridge after the truck is located with reference to the car, so that one of the recesses 45 on the bridge may always be brought into registration with the ball 60. Then a simple manipulation of the locking pins 65 by their handles 67, or the operation of the cam lever 72, locks the bridge in position.

The same locking device (of either form) is available to coact with the articulated member 50 in the bridge, when the entire bridge is slid into housing, to hold the entire bridge in idle position, as when the truck is to travel on the highway. This position is indicated in Fig. 6. It will be seen that in this position a recess 53 on the side of the articulated member of the bridge stands in registration with the balls 60 and, hence, when the balls are pushed into the locking position the entire bridge is locked substantially within the housing, as shown in Fig. 6.

As heretofore stated, the bridge not only positions the highway vehicle in reference to the car but forms a support for the container in traveling from one to the other. Each member of the bridge is formed at the top as of channel shape, as indicated at 48 and 58 in Figs. 7 and 8, and this channel is adapted to receive the skid rail c on the container as such rail passses from the channel of one vehicle to that of the other.

To provide an easy incline from the top of the bridge member 40 to the channel a on the truck. I provide a wedge shaped block 80 which occupies the channel 48 and rests freely therein, while being held to the housing, so that the bridge slides beneath the block. To effect this the wedge shaped portion of the block 80 has a flat continuation 81 with rectangular opening 82, which opening is occupied by a slightly smaller correspondingly-shaped block 39 welded to the underside of the housing top, as shown in Figs. 4 and 7.

The wedge block 80, it will be seen, cannot be displaced, but does not interfere with the sliding of the bridge in and out, the block in use occupying indefinite regions of the bridge channel 48 but always adjacent the end of the truck channel to which it makes a proper ramp. When the bridge is in idle position, the block rests in the channel 53 of the extension 50.

It will be seen that my invention provides firm and substantial articulated bridges telescopically carried by the truck. These bridges, during the travel of the truck, are locked in idle position within housings in the floor frame of the truck, and project only an insignificant distance beyond the end of the housing. In use the bridge may extend for various distances from the edge of the truck; may be readily locked in selected position, and when locked the articulated portion of the bridge is free to swing on its pivot.

Thus, I have not only provided for different distances between the two vehicles and different elevations of such vehicles, but also for the changes in relative elevation of the two vehicles due to the relief of the springs of the vehicle as the body passes from it, or the stressing of the springs as the body passes onto such vehicle.

I claim:

1. The combination of a vehicle, an articulated bridge adapted to telescope into a space within the confines of the vehicle or to be drawn partially out of same, one of the members of such articulated bridge having recesses in the opposite sides, pair of balls movably supported and adapted to register with such opposed recesses, and means on the outer sides of the balls to force them into recesses and there retain them to lock the bridge in position.

2. The combination of a vehicle, an open ended housing carried thereby, a sliding bridge member occupying the housing, an extension bridge member pivoted to the sliding member, sliding member having a row of recesses in each of its opposite sides, a pair of balls movable in guiding openings at opposite sides of the housing respectively, and adapted to engage any of said recesses, a pair of manual cam devices for moving the balls into registering bridge recesses and thus retaining them.

3. The combination of a vehicle, an articulated bridge slidably carried thereby, and a block slidably resting on the top of the bridge anchored to the vehicle, said block having an inclined upper face leading from the top of the bridge to a support on the vehicle.

4. The combination of a vehicle having a guiding channel, a housing beneath the channel, a bridge slidably carried thereby, and a block slidably resting on the top of the bridge and having an extension within the housing and connected to it, said block having an inclined upper face leading from the top of the bridge to the guiding channel on the vehicle.

5. The combination of a vehicle, an open ended housing carried thereby, a bridge member slidably occupying the housing and adapted to project therefrom, an extension bridge member pivoted to the outer portion of the sliding member, the vehicle carrying a load supporting surface above the housing and the top of the bridge members being formed with load supporting surfaces whereby the skid rail of a container may rest on the bridge or on the vehicle, and an inclined block anchored to the housing and resting on the sliding bridge member and forming a guideway from the load supporting surface of that bridge member to the load supporting surface of the vehicle.

RAGNAR A. NORBOM.